United States Patent
Kojima et al.

(10) Patent No.: US 8,146,878 B2
(45) Date of Patent: Apr. 3, 2012

(54) VEHICLE SEAT SLIDING APPARATUS

(75) Inventors: Yasuhiro Kojima, West Bloomfield, MI (US); Hideo Nihonmatsu, Anjo (JP); Ryousuke Mizuno, Toyota (JP); Genta Moriyama, Anjo (JP); Mikihito Nagura, Okazaki (JP); Taku Harada, Nisshin (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 350 days.

(21) Appl. No.: 12/569,372

(22) Filed: Sep. 29, 2009

(65) Prior Publication Data

US 2010/0090082 A1 Apr. 15, 2010

(30) Foreign Application Priority Data

Oct. 15, 2008 (JP) ................. 2008-266641
Mar. 27, 2009 (JP) ................. 2009-080240

(51) Int. Cl.
*F16M 13/00* (2006.01)
(52) U.S. Cl. ....................... 248/429; 248/430
(58) Field of Classification Search .................. 248/424, 248/425, 429, 430; 297/341; 296/65.13, 296/65.14
See application file for complete search history.

(56) References Cited

U.S. PATENT DOCUMENTS

| 4,568,054 | A | 2/1986 | Degremont | |
|---|---|---|---|---|
| 5,775,662 | A | 7/1998 | Hoshihara et al. | |
| 6,869,057 | B2 * | 3/2005 | Matsumoto et al. | 248/430 |
| 7,604,214 | B2 * | 10/2009 | Kojima et al. | 248/430 |
| 7,717,490 | B2 * | 5/2010 | Kojima et al. | 296/65.13 |
| 7,963,496 | B2 * | 6/2011 | Kojima et al. | 248/429 |
| 8,052,113 | B2 * | 11/2011 | Moriyama et al. | 248/430 |
| 2007/0090263 | A1 * | 4/2007 | Yamada et al. | 248/429 |
| 2008/0048476 | A1 * | 2/2008 | Kojima et al. | 297/341 |
| 2009/0102263 | A1 * | 4/2009 | Kojima et al. | 297/344.1 |
| 2009/0314916 | A1 * | 12/2009 | Kojima et al. | 248/429 |
| 2010/0181460 | A1 * | 7/2010 | Park et al. | 248/429 |
| 2010/0243853 | A1 * | 9/2010 | Moriyama et al. | 248/429 |

FOREIGN PATENT DOCUMENTS

| JP | 59-2938 | 1/1984 |
|---|---|---|
| JP | 3449227 | 7/2003 |
| JP | 3646356 | 2/2005 |
| JP | 3647502 | 2/2005 |

OTHER PUBLICATIONS

U.S. Appl. No. 12/569,301, filed Sep. 29, 2009, Kojima, et al.
U.S. Appl. No. 12/568,919, filed Sep. 29, 2009, Kojima, et al.

* cited by examiner

*Primary Examiner* — Ramon Ramirez

(74) *Attorney, Agent, or Firm* — Oblon, Spivak, McClelland, Maier & Neustadt, L.L.P.

(57) ABSTRACT

In a vehicle seat sliding apparatus of the type wherein rotating an operating lever causes a lock lever to allow an upper rail to slide along a lower rail, the operating member is supported by a supporting bracket fixed to the upper rail to rotate about a fulcrum which is in the form of a plate of the bracket. The operating lever is provided with a slit into which a spring is fitted for being urged. The bracket also holds the spring. To avoid an engagement between the plate and the slit when the operating lever passes during an assembly of the apparatus, the plate is configured to incline relative to the slit.

6 Claims, 9 Drawing Sheets

WIDTHWISE DIRECTION

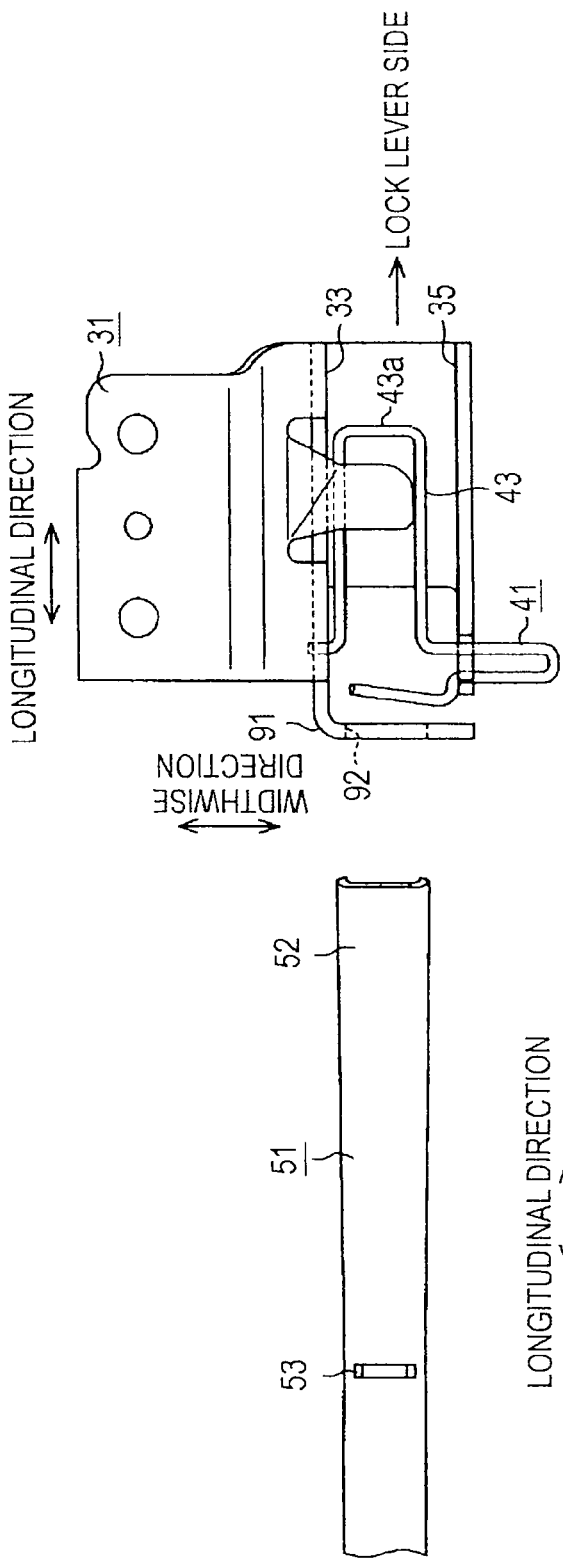
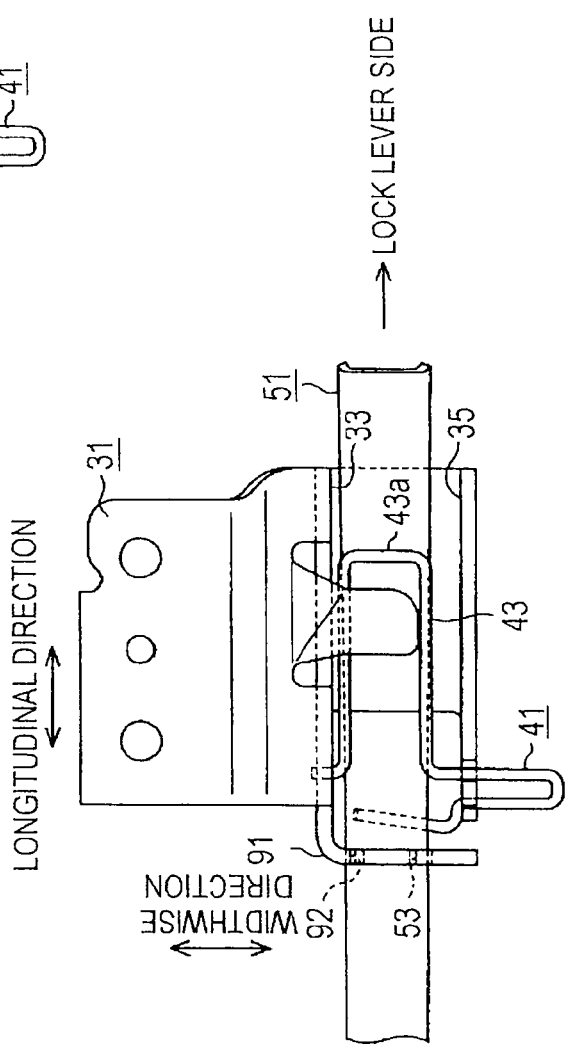
FIG. 7A
FIG. 7B

US 8,146,878 B2

VEHICLE SEAT SLIDING APPARATUS

CROSS REFERENCE TO RELATED APPLICATION

This application is based on and claims priority under 35 U.S.C. Section 119 to Japanese Patent Application No. 2009-080240 filed on Mar. 27, 2009, the entire content of which is incorporated herein by reference.

BACKGROUND OF THE INVENTION

1. Field of the Invention

The invention relates to a vehicle seat sliding apparatus.

2. Description of the Related Art

In the related art, various types of vehicle seat sliding apparatuses are proposed (for example, Japanese Patent No. 3646356, Japanese Patent No. 3449227, Japanese Patent No. 3647502, JP-A-59-2938). These apparatuses each include a lower rail and an upper rail connected to the lower rail so as to be movable with respect to the lower rail. Then, a lock lever adapted to engage the lower rail and selectively restrict the movement of the upper rail with respect to the lower rail is rotatably connected to the upper rail. The upper rail is also provided with an operating lever which is capable of transmitting an operating force to release the movement restriction with respect to the lock lever, and a torsion spring adapted to resiliently hold the operating lever.

Incidentally, the vehicle seat sliding apparatuses in Japanese Patent No. 3646356, Japanese Patent No. 3449227, and Japanese Patent No. 3647502 are all configured to assemble the torsion spring to a lever (lock lever or the like) movable (rotatable) with respect to the upper rail, and hence the assembly work of the torsion spring becomes complicated. Then, a rod-shaped or a pipe-shaped operating lever has a configuration to be connected to the lever including the torsion spring assembled thereto in a state of being engaged with the torsion spring, and hence the assembly work of the operating lever also becomes complicated. In particular, in Japanese Patent No. 3646356 and Japanese Patent No. 3647502, the operating lever is connected so as to rotate integrally with the lock lever and, when the direction of rotation of the operating lever and the direction of rotation of the lock lever differ from each other, for example, an axis of rotation cannot be used commonly, so that the number of components and the number of steps of assembly are increased.

SUMMARY OF THE INVENTION

Thus, a need exists for a seat sliding apparatus which is not susceptible to the drawback mentioned above.

In order to solve the above-described problem, a first aspect of the invention provides a vehicle seat sliding apparatus including: a lower rail adapted to be fixed to a vehicle-floor, an upper rail adapted to be fixed to a seat cushion and connected to the lower rail so as to be movable with respect to the lower rail, a lock lever rotatably connected to the upper rail and adapted to engage the lower rail to selectively restrict the movement of the upper rail with respect to the lower rail; a supporting bracket fixed to the upper rail; an operating lever rotatably connected to the supporting bracket and being capable of transmitting an operating force to the lock lever to release the restriction of movement by being linked with the lock lever; and an urging member adapted to resiliently hold the operating lever, the supporting bracket including a plate-shaped supporting wall portion which is adapted to serve as a fulcrum of rotation of the operating lever at an abutting portion with respect to an upper portion of the operating lever when the operating lever is inserted therein along the longitudinal direction of the upper rail, the operating lever being formed with a slit-like holding groove adapted to lock the urging member therein on the upper portion thereof on the side of the lock lever with respect to the supporting wall portion in terms of the longitudinal direction of the upper rail so as to extend in the direction orthogonal to the direction of insertion of the operating lever, and the supporting wall portion having a molded portion opposing the upper portion of the operating lever within the range of the holding groove in the direction orthogonal to the direction of insertion of the operating lever and having a width wider than the width of the holding groove in terms of the direction of insertion of the operating lever.

BRIEF DESCRIPTION OF THE DRAWINGS

FIG. 7A is a plan view showing a related mode of the invention;

FIG. 7B is a plan view showing the related mode of the invention;

DESCRIPTION OF THE PREFERRED EMBODIMENTS

Figure 1:
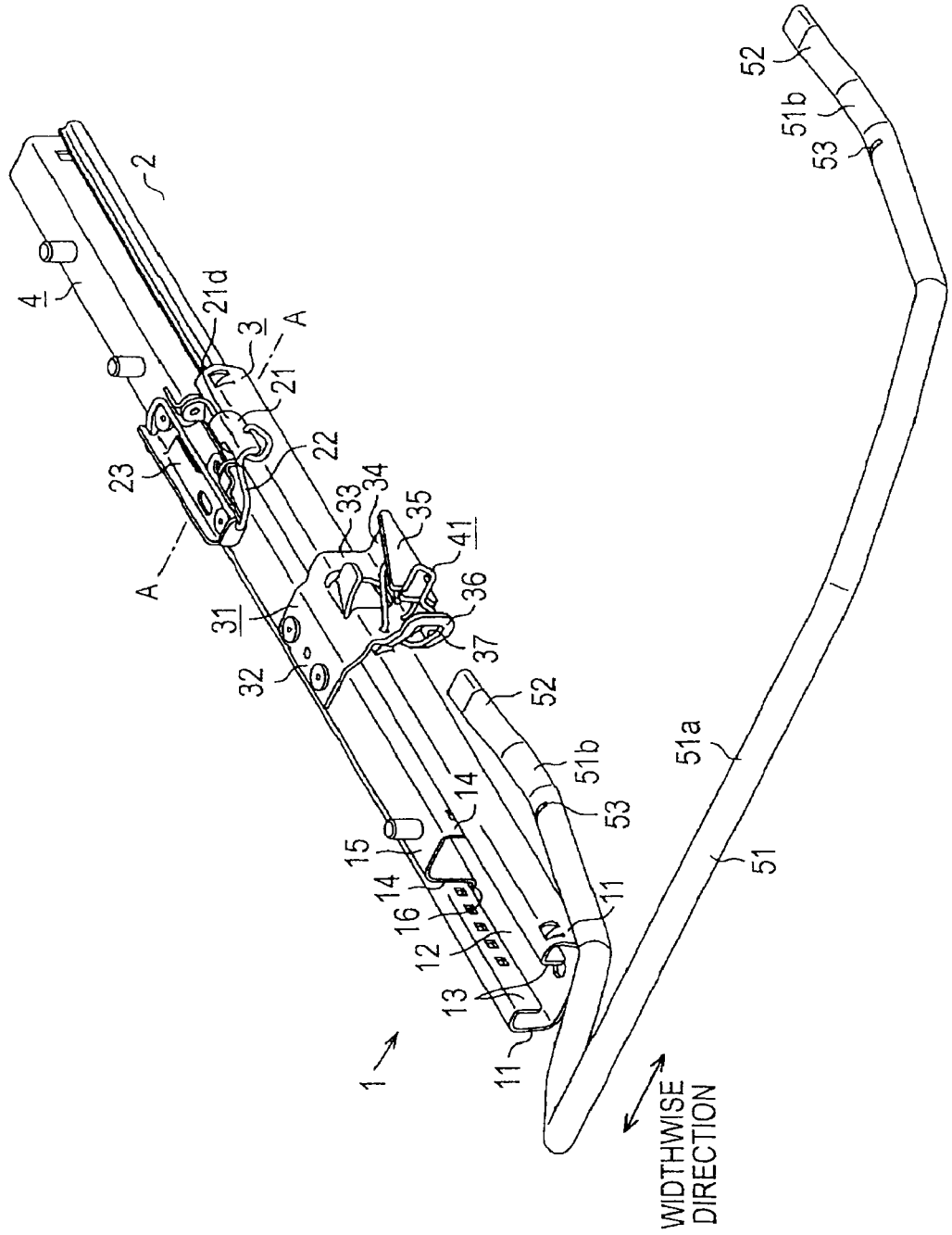
FIG. 1 is a perspective view showing an embodiment according to the invention.

Referring now to the drawings, an embodiment in which the invention is embodied will be described below.

Figure 2:
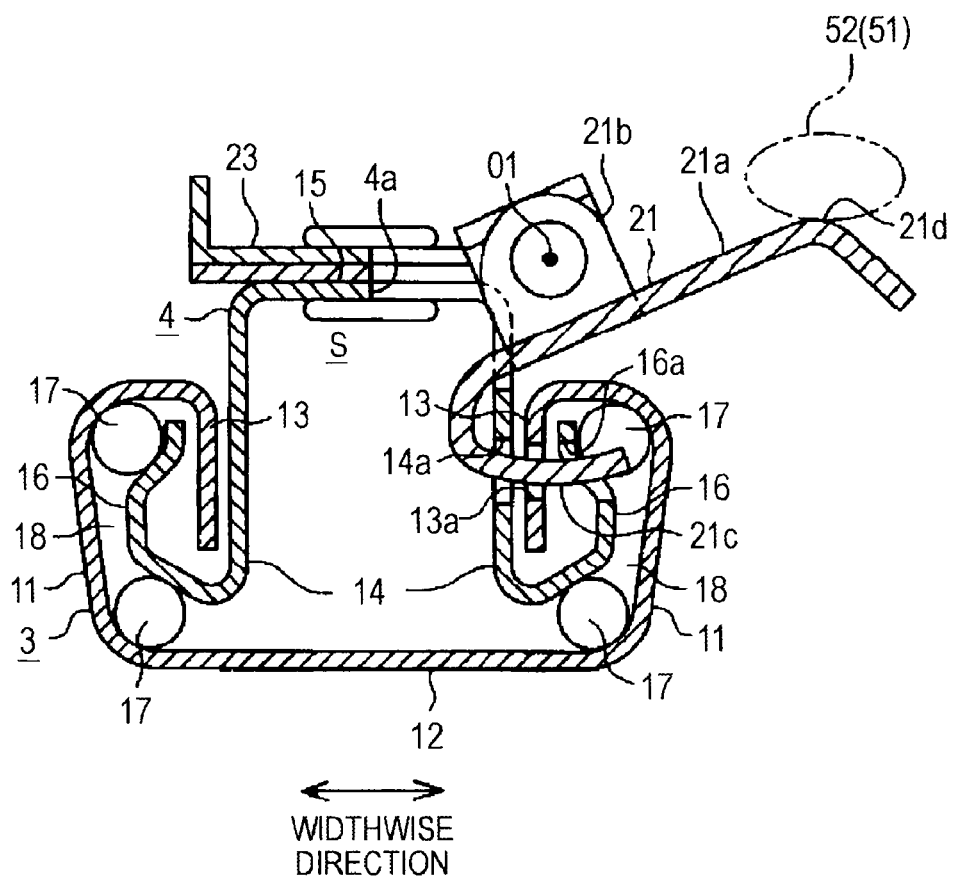
FIG. 2 is a cross-sectional view taken along the line A-A in FIG. 1.
Figure 12:
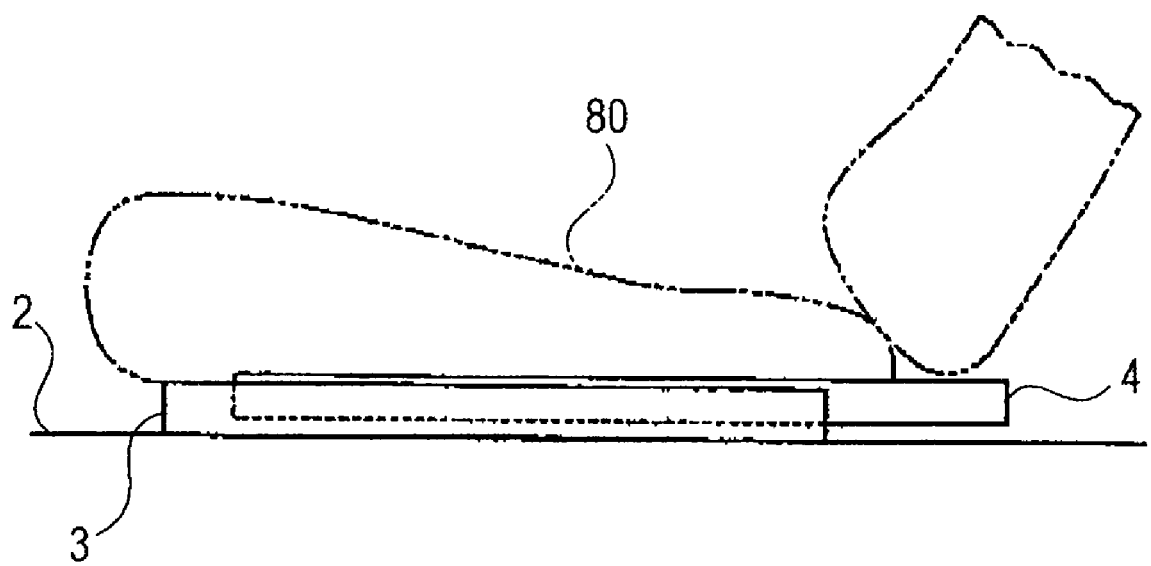
FIG. 12 is a schematic diagram showing the embodiment of the invention.

FIG. 1 is a perspective view showing a vehicle seat sliding apparatus 1 according to the embodiment which is mounted on a vehicle such as an automotive vehicle, and FIG. 2 is a lateral cross-sectional view taken along the line A-A in FIG. 1. As shown in FIG. 1, FIG. 2, and FIG. 12, a lower rail 3 is fixed to a vehicle-floor 2 in a state of extending in the fore-and-aft direction of the vehicle, and an upper rail 4 is mounted to the lower rail 3 so as to be movable relatively to the lower rail 3. A seat cushion 80 is fixed to the upper rail 4.

As shown in FIG. 2, the lower rail 3 includes a pair of side wall portions 11 extending upright from both sides thereof in terms of the widthwise direction and a bottom wall portion 12 connecting proximal ends (lower ends) of the side wall portions 11. Then, folded-back wall portions 13 which are formed to protrude inward in terms of the widthwise direction and then folded backward toward the proximal end sides of the side wall portions 11 are formed continuously from distal ends (upper ends) of the respective side wall portions 11.

In contrast, the upper rail 4 includes a pair of side wall portions 14 extending in the vertical direction between the both folded-back wall portions 13 of the lower rail 3 and a lid wall portion 15 connecting proximal ends (upper ends) of the side wall portions 14. Then, folded-back wall portions 16 which are formed to protrude outward in terms of the widthwise direction and then folded so as to be surrounded by the side wall portions 11 and the folded-back wall portions 13 are formed continuously from distal ends (lower ends) of the respective side wall portions 14.

In other words, the lower rail 3 and the upper rail 4 each include a U-shaped rail cross section with opening sides butted against to each other, and are held so as not to be disconnected from each other in the vertical direction mainly by the engagement of the folded-back wall portions 13 and 16. The rail cross section formed by the lower rail 3 and the upper rail 4 assumes so-called a box shape in a rectangular shape. The lower rail 3 defines an internal space S in cooperation with the upper rail 4.

Retainers 18 adapted to hold pairs of rolling elements 17 arranged in the vertical direction are mounted between the respective folded-back wall portions 18 and the side wall portion 11 opposing thereto, and the upper rail 4 is supported so as to be slidable in the longitudinal direction (the fore-and-aft direction of the vehicle) with respect to the lower rail 3 in a state of rolling the rolling elements 17 with respect to the lower rail 3.

Here, the folded-back wall portion 13 on one side of the lower rail 3 in terms of the widthwise direction (right side in FIG. 2) is formed with a plurality of lock holes 13a arranged crosswise at predetermined intervals over the substantially entire length of the longitudinal direction (the direction orthogonal to the paper plane) thereof. In contrast, a through hole 4a formed by removing a corner formed by the lid wall portion 15 and the side wall portion 14 on one side in terms of the widthwise direction (right side in FIG. 2) is formed at a center portion of the upper rail 4 in terms of the longitudinal direction, and the side wall portion 14 concerned is formed with a plurality of insertion holes 14a arranged crosswise on the lower portion thereof at the predetermined distances within a range of the through hole 4a in terms of the longitudinal direction and, in addition, the folded-back wall portion 16 which continued from the side wall portion 14 concerned is formed with the same number of insertion holes 16a as the insertion holes 14a arranged crosswise at the predetermined intervals. The plurality of insertion holes 14a, 16a are arranged so as to oppose to each other in terms of the widthwise direction at positions which can align with the same number of lock holes 13a on the lower rail 3 adjacent to each other in terms of the longitudinal direction.

A lock lever 21 formed of a plate member is rotatably connected to the upper rail 4 via a bracket 23 within a range of the through hole 4a in terms of the longitudinal direction. The lock lever 21 includes a flat panel-shaped body portion 21a and a pair of supporting strips 21b bent upward from both ends of a lower portion of the body portion 21a in terms of the longitudinal direction (the direction orthogonal to the paper plane) of the upper rail 4. The lock lever 21 is supported by the both supporting strips 21b so as to be rotatable about an axis of rotation O1 extending in the longitudinal direction of the upper rail 4 outside the internal space S. The lock lever 21 is formed with locking claws 21c formed from the body portion 21a so as to enter the interior of the internal space S through the through holes 4a and bent outward in terms of the widthwise direction by the same number as the insertion holes 14a or the like at the predetermined intervals. The respective locking claws 21c are arranged so as to be inserted into and pulled out from the insertion holes 14a, 16a in association with the rotation of the lock lever 21 about the axis of rotation O1.

When the respective locking claws 21c are inserted into the lock holes 13a as well as into the insertion holes 14a, 16a, the relative movement between the lower rail 3 and the upper rail 4 is restricted. Alternatively, when the respective locking claws 21c are pulled out from the insertion holes 16a, the lock holes 13a, and the insertion holes 14a in sequence, the relative movement between the lower rail 3 and the upper rail 4 is allowed.

A torsion wire 22 (see FIG. 1) formed of a single wire member is installed on an upper portion of the upper rail 4. The torsion wire 22 is locked at one end and the other end with the lock lever 21 and the bracket 23, respectively. The lock lever 21 is constantly urged in the direction of rotation on the side where the locking claws 21c are inserted into the insertion holes 14a and the like (the counterclockwise direction in FIG. 2) by the torsion wire 22.

In addition, the lock lever 21 is bent from an upper portion of the body portion 21a toward a distal end thereof so as to be inclined obliquely downward, and forms an abutting portion 21d on an upper surface of the bent portion concerned.

The vehicle seat sliding apparatus 1 includes the lower rails 3, the upper rails 4, and the lock levers 21 described above disposed in pair respectively in terms of the rail width direction, and a seat cushion which forms a seating portion of an occupant is fixed to and supported by the both upper rails 4. Therefore, when the relative movement between the upper rails 4 with respect to the lower rails 3 is restricted by the engagement between the locking claws 21c of the lock levers 21 and the lock holes 13a of the lower rails 3, the seat is held at a predetermined position with respect to the vehicle-floor 2. Also, when the restriction of the relative movement is released by the release of the engagement between the locking claws 21c of the lock levers 21 and the lock holes 13a of the lower rails 3, adjustment in position of the seat with respect to the vehicle-floor 2 in the longitudinal direction of the upper rails 4 (the fore-and-aft direction of the vehicle) is allowed.

As shown in FIG. 1, a supporting bracket 31 formed of a plate member is fixed to the each upper rail 4 on one side (lower left side in FIG. 1) of the lock lever 21 in terms of the longitudinal direction. The supporting bracket 31 includes a mounting wall portion 32 extending in the widthwise direction of the upper rail 4 and being tightened to the lid wall portion 15, and also includes a first side wall portion 33 extending downward from a distal end of the mounting wall portion 32 outside the lower rail 3 in terms of the widthwise direction. The supporting bracket 31 includes a bottom wall portion 34 extending from a lower end of the first side wall portion 33 outward in terms of the widthwise direction of the lower rail 3, includes a triangle second side wall portion 35 extending upward from a distal end of the bottom wall portion 34, and further includes a supporting wall portion 36 extending from the end on one side (lower left side in FIG. 1) of the first side wall portion 33 outward In terms of the widthwise direction of the lower rail 3.

Figure 4A:
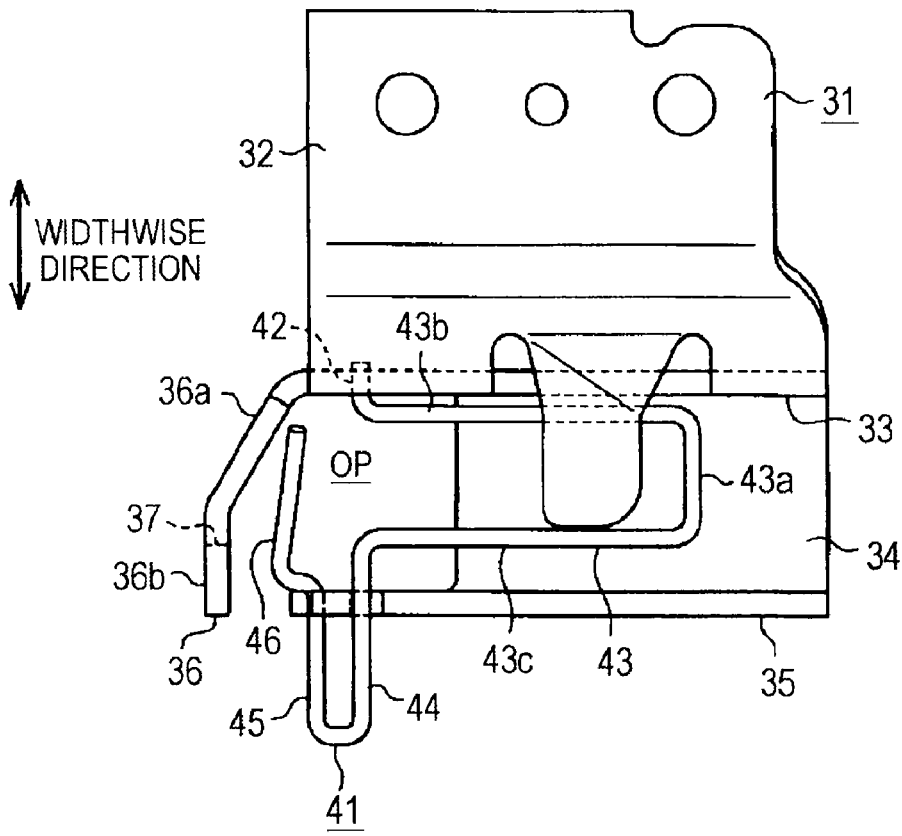
FIG. 4A is a plan view showing the same embodiment.

The first and second side wall portions 33 and 35 are arranged in parallel to each other and apart from each other in the rail width direction (see FIG. 4A). Then, the second side wall portion 35 includes a projecting strip 35a at a distal end portion thereof on the side of the supporting wall portion 36, and includes a pair of groove portions 35b, 35c on the proximal side of the projecting strip 35a (see FIG. 4B). The directions of depression of the both groove portions 35b, 35c are substantially orthogonal to each other. The bottom wall portion 34 connects lower ends of the first and second side wall portions 33 and 35 on one side (right side in FIG. 4A) in terms of the longitudinal direction of the upper rail 4, and a range defined by the bottom wall portion 34 and the supporting wall portion 36 in plan view is an opening OP. In addition, the supporting wall portion 36 includes an inclined wall portion 36a as a molded portion which is displaced, away from the first side wall portion 33 in the longitudinal direction of the upper rail 4 as it goes outward in terms of the widthwise direction of the upper rail 4 from one side end of the first side wall portion 33, and a linear wall portion 36b extending from a distal end of the inclined wall portion 36a in the rail width direction. Then, the supporting wall portion 36 is formed with a square insertion hole 37 opening in the longitudinal direction of the upper rail 4. The insertion hole 37 is formed so as to extend across the range of the inclined wall, portion 36a and the linear wall portion 36b.

Figure 4B:
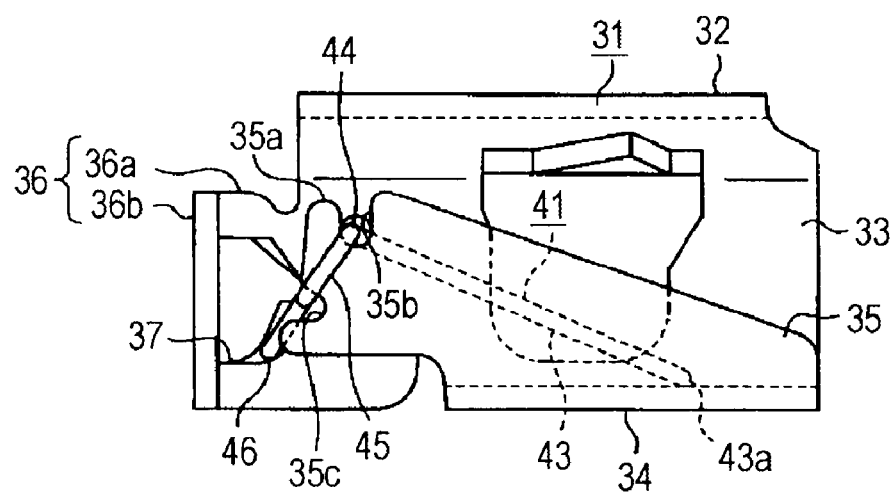
FIG. 4B is a side view showing the same embodiment.

As shown in FIGS. 4A and 4B, the supporting bracket 31 is attached with a torsion spring 41 formed of a single wire member as an urging member. The torsion spring 41 includes a first terminal portion 42 extending in the rail width direction at a position of the opening OP and inserted into and locked by the first side wall portion 33, and also includes a first extending portion 43b being arranged between the first and second side wall portions 33 and 35 above the bottom wall portion 34 and extending from the proximal end of the first terminal portion 42 toward the lock lever 21 in the longitudinal direction of the upper rail 4, a locked strip portion 43a extending linearly toward the second side wall portion 35 in the rail width direction in a state of being bent from a distal end of the first extending portion 43b, and a second extending portion 43c extending toward the opposite side from the lock lever 21 in the longitudinal direction of the upper rail 4 in a state of being bent from a distal end of the locked strip portion 43a. The first extending portion 43b, the locked strip portion 43a, and the second extending portion 43c form a so-called hairpin-shaped extending portion 43. The torsion spring 41 also includes a shaft portion 44 which is bent from a distal end of the second extending portion 43c (extending portion 43) at the position of the opening OP outward in the rail width direction and is inserted into and locked by the second side wall portion 35 so as to assume a state of fitted into one of the groove portions 35b of the second side wall portion 35. The shaft portion 44 extends coaxially with the first terminal portion 42, and serves as an axis of rotation of the extending portion 43 (first extending portion 43b, locked strip portion 43a, and second extending portion 43c) in cooperation with the first terminal portion 42. In addition, the torsion spring 41 includes a locked portion 45 which is bent from a distal end of the shaft portion 44, and is inserted into and locked by the second side wall portion 35 so as to assume a state of fitted into the other groove portion 35c of the second side wall portion 35. The locked portion 45 twists the shaft portion 44 to cause the locked strip portion 43a to generate a downward urging force. Also, the torsion spring 41 includes a second terminal portion 46 extending from a distal end of the locked portion 45 at the position of the opening OP.

In an assembly step of the torsion spring 41, first of all, the first terminal portion 42 is inserted into the first side wall portion 33 in a state in which the extending portion 43 is arranged on the bottom wall portion 34, which is positioned between the first and second side wall portions 33 and 35. Then, when the projecting strip 35a is inserted between the shaft portion 44 and the locked portion 45 in this state, the shaft portion 44 and the locked portion 45 are fitted into the pair of groove portions 35b, 35c respectively while being broadened by the projecting strip 35a, so that the projecting strip 35a is resiliently clamped. Accordingly, the assembly work of the torsion spring 41 to the supporting bracket 31 is completed.

As shown in FIG. 1, an operating lever 51 formed by bending a tubular member is connected to the supporting bracket 31 on each side in the rail width direction. In other words, the operating lever 51 is formed into a U-shape having an operating portion 51a extending in the rail width direction, and a pair of distal end portions 51b bent respectively from both ends of the operating portion 51a toward the lock levers 21 in the longitudinal direction of the upper rail 4. Then, the operating lever 51 includes flat-shaped pressing portions 52 formed by collapsing the respective distal end portions 51b in the vertical direction and slit-like holding grooves 53 formed on the proximal side of the each flat-shaped pressing portion 52 so as to extend in the rail width direction by removing part of an upper portion thereof. The each holding groove 53 extends in the direction orthogonal to the direction of insertion of the operating lever 51.

Figure 3:
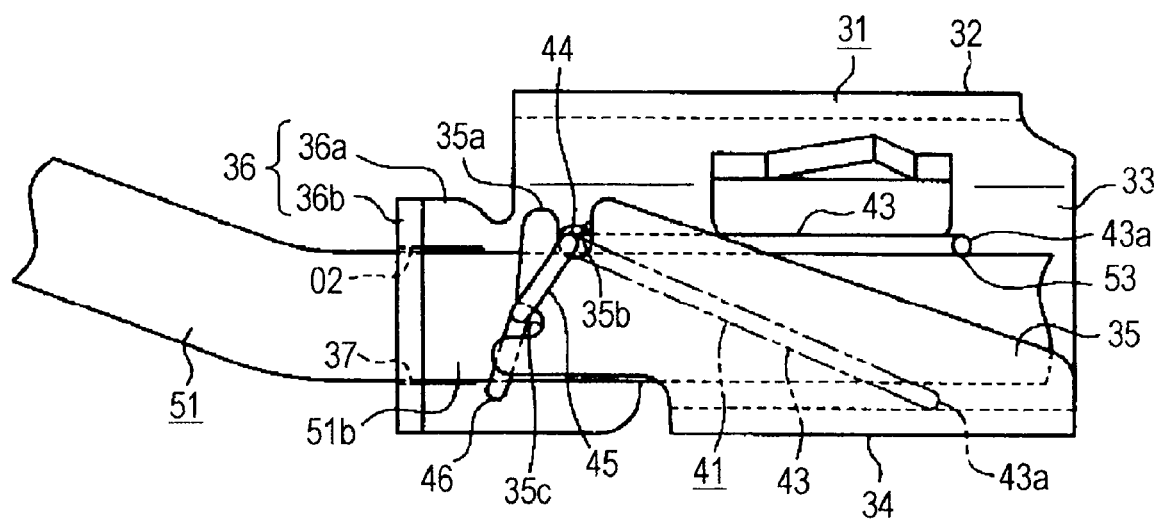
FIG. 3 is a side view showing the same embodiment.

The operating lever 51 is supported by the supporting wall portion 36 (supporting bracket 31) by the each distal end portion 51b thereof being inserted into the insertion hole 37 of the supporting wall portion 36 along the longitudinal direction of the upper rail and is linked with the lock lever 21 by the respective pressing portions 52 being placed on the abutting portions 21d of the lock lever 21 (see FIG. 2). At this time, as shown in FIG. 3, the extending portion 43 of the each torsion spring 41 is pressed against the distal end portion 51b (pressing portion 52) of the operating lever 51 passing under the extending portion 43 along the bottom wall portion 34 between the first and second side wall portions 33 and 35, and hence is rotated upward (counterclockwise in the drawing) about the first terminal portion 42 and the shaft portion 44 against the urging force. Then, in association with the insertion of the each distal end portion 51b of the operating lever 51, when the holding groove 53 reaches the linear locked strip portion 43a which slides on the upper portion thereof, the locked strip portion 43a is fitted into the holding groove 53. Accordingly, the each distal end portion 51b of the operating lever 51 is locked and prevented from being disconnected in a state in which the upper portion is urged downward in the holding groove 53 by the torsion spring 41 (locked strip portion 43a). Needless to say, the locked portion 45 generates an urging force which urges the upper portion (holding groove 53) of the operating lever 51 downward. In contrast, the second terminal portion 46 of the torsion spring 41 urges the lower portion of the each distal end portion 51b of the operating lever 51 upward at the position of the opening OP.

Figure 5A:
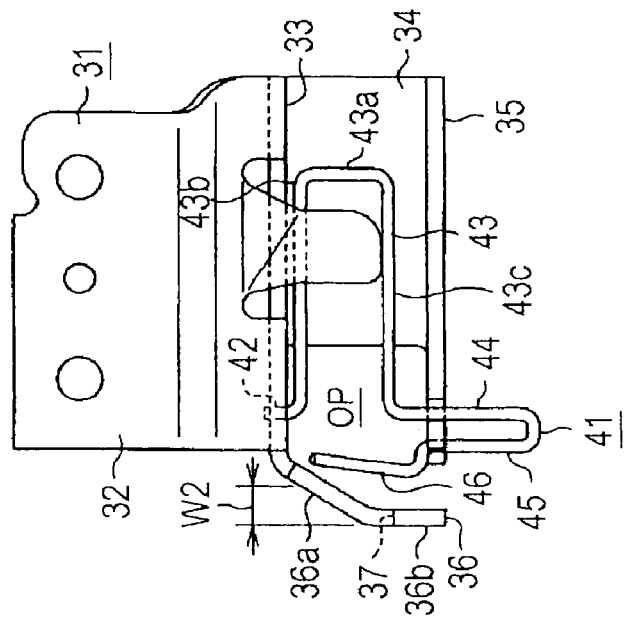
FIG. 5A is a plan view showing a state of assembly in the same embodiment.
Figure 5A:
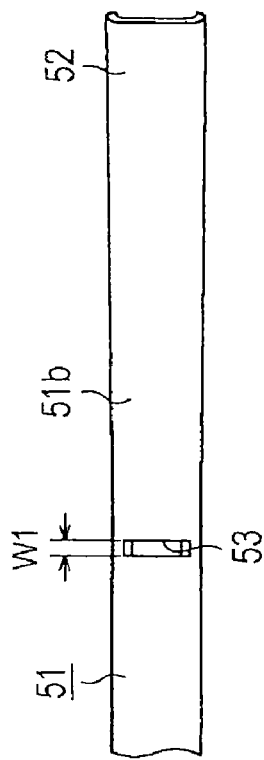
Figure 5B:
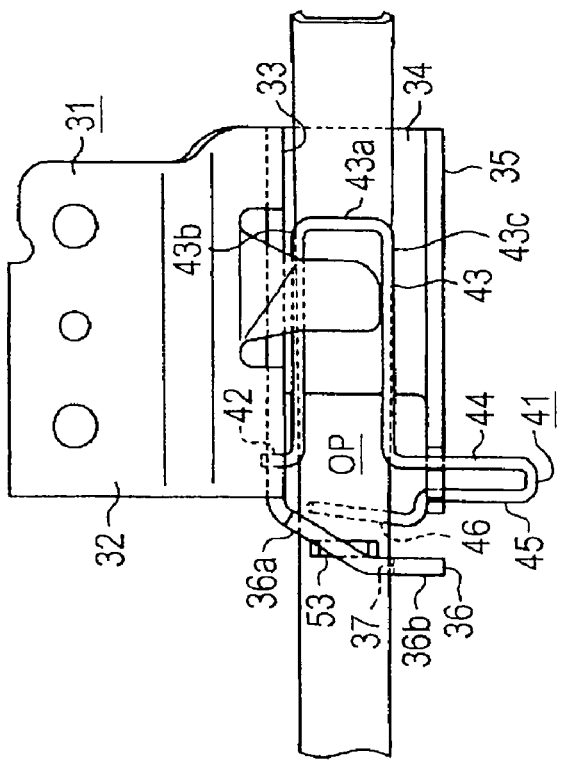
FIG. 5B is a plan view showing the state of assembly in the same embodiment.

As shown in FIGS. 5A and 5B, when the width of the holding groove 53 in the direction of insertion of the operating lever 51 is expressed as a width W1, the supporting wall portion 36 having the inclined wall portion 36a has a width W2 substantially larger than the width W1 within a range of the holding groove 53 in the direction orthogonal to the direction of insertion of the operating lever 51. In other words, the supporting wall portion 36 opposes the upper portion of the operating lever 51 and has the width W2 substantially larger than the width W1. Therefore, when the holding groove 53 passes the supporting wall portion 36 during the insertion and assembly works of the operating lever 51, the supporting wall portion 36 is not fitted to the holding groove 53 by being blocked by the inclined wall portion 36a.

In other words, as shown in FIGS. 7A and 7B, it is assumed that the supporting bracket 31 includes a flat-plate shaped supporting wall portion 91 extending from a distal end of the first side wall portion 33 toward the second side wall portion 35 in the widthwise direction, and the supporting wall portion 91 is formed with an insertion hole 92 which penetrates through the longitudinal direction of the upper rail 4. In this case, when assembling the operating lever 51 to the supporting bracket 31, the holding groove 53 of the operating lever 51 passes the supporting wall portion 91, the supporting wall portion 91 may interfere with the holding groove 53 so as to fit therein as shown in FIG. 7B, so that the assembleability of the operating lever 51 might be impaired. In contrast, in order to avoid the deterioration of the assembleability as described above, it is conceivable to increase the thickness of the supporting wall portion 91 (supporting bracket 31) to an extent which cannot be fitted into the holding groove 53. However, in this case, increase in weight or degradation of workability of the supporting bracket 31 is inevitable. In contrast, it is conceivable to reduce the width of the holding groove 53 to an extent that the supporting wall portion 91 cannot be fitted. However, in this case, a retention force to retain the torsion spring 41 (locked strip portion 43a) in the holding groove 53 is reduced. Alternatively, when the torsion spring 41 is thinned (reduced in diameter) in association with the reduction of the width of the holding groove 53, the urging force of the torsion spring 41 is insufficient.

However, in this embodiment, since the supporting wall portion 36 does not fit into the holding groove 53 in the configuration as described above, the assembleability of the operating lever 51 is improved.

Then, the each supporting wall portion 36 (insertion hole 37) serves as a fulcrum of the rotation of the operating lever 51 at the abutting portion of the operating lever 51 with respect to an upper portion of the distal end portion 51b. Therefore, the each supporting wall portion 36 supports the operating lever 51 so as to be rotatable about an axis of rotation O2 set at an abutment portion thereof with respect to the operating lever 51 (an upper portion of the distal end portion 51b). The reason why the fulcrum of the rotation of the operating lever 51 is set using the supporting bracket 31 (supporting wall portions 36) is for balancing an operating force and an operating amount of the operating lever 51 required for releasing the lock lever 21 using the principle of a lever. It is needless to say that the direction of rotation of the operating lever 51 is different from the direction of rotation of the lock lever 21. The torsion spring 41 is adapted to retain the operating lever 51 resiliently for maintaining the linked state of the operating lever 51 with respect to the lock lever 21. Alternatively, the torsion spring 41 may be adapted to hold the operating lever 51 resiliently so that the operating lever 51 releases the operating force for releasing the restriction of movement of the lower rail 3 and the upper rail 4 with respect to the lock lever 21 is also applicable.

In this configuration, it is assumed that the operating lever 51 is operated to lift the operating portions 51a, and the both distal end portions 51b of the operating lever 51 are rotated clockwise about the axis of rotation O2 in FIG. 3. At this time, the each pressing portion 52 of the operating lever 51 is moved downward in FIG. 2, and hence presses the abutting portion 21d of the lock lever 21 downward. Accordingly, the each lock lever 21 is rotated clockwise about the axis of rotation O1, that is, in the direction of rotation in which the locking claw 21c is moved away from the insertion hole 14a or the like against the urging force of the torsion wire 22. Accordingly, the restriction of the relative movement between the lower rail 3 and the upper rail 4 is released.

In contrast, when the operating force of the operating lever 51 (the operating portion 51a) is released, the lock lever 21 is urged by the torsion wire 22, and is rotated (backward) counterclockwise about the axis of rotation O1 in FIG. 2, that is, in the direction of rotation on the side in which the locking claw 21c is inserted into the insertion hole 14a or the like. Accordingly, the relative movement between the lower rail 3 and the upper rail 4 is restricted again. Also, the both distal end portions 51b of the operating lever 51 are rotated counterclockwise about the axis of rotation O2 in FIG. 3 in association with the movement of the lock levers 21.

As described above in detail, the following advantages are achieved according to this embodiment.

(1) In this embodiment, the operating lever 51 can be assembled easily to the supporting bracket 31 by inserting the same through the supporting wall portion 36 along the longitudinal direction of the upper rail 4 and causing the torsion spring 41 to be locked in the holding groove 53. Accordingly, the axis of rotation O2 of the operating lever 51 can be set separately from the axis of rotation O2 of the lock lever 21 only by inserting the operating lever 51 into the supporting wall portion 36. In this case, the direction of rotation of the operating lever 51 does not have to match with the direction of rotation of the lock lever 21. Also, when the holding groove 53 passes the supporting wall portion 36 during the insertion and assembly works of the operating lever 51, the inclined wall portion 36a prevents the supporting wall portion 36 (the fulcrum portion of the operating lever 51) from being fitted into the holding groove 53. Accordingly, the assembly work of the operating lever 51 can be smoothly performed. Also, since the thickness of the supporting wall portion 36 by itself is not basically constrained by the width of the holding groove 53, for example, weight increase in association with needless increase in thickness of the supporting wall portion 36 (supporting bracket 31) or degradation of workability of the supporting bracket 31 can be restrained.

(2) In this embodiment, the inclined wall portion 36a of the supporting wall portion 36 can be provided in an extremely simple method by bending a supporting wall portion 61, for example.

(3) In this embodiment, since a transmitting member (lever or the like) for changing the direction does not have to be provided separately between the lock lever 21 and the operating lever 51 even though the direction of rotation of the lock lever 21 is different from the direction of rotation of the operating lever 51, increase in number of components and the number of assembly steps can be restrained.

The embodiment described above may be modified as follows.

Figure 6:
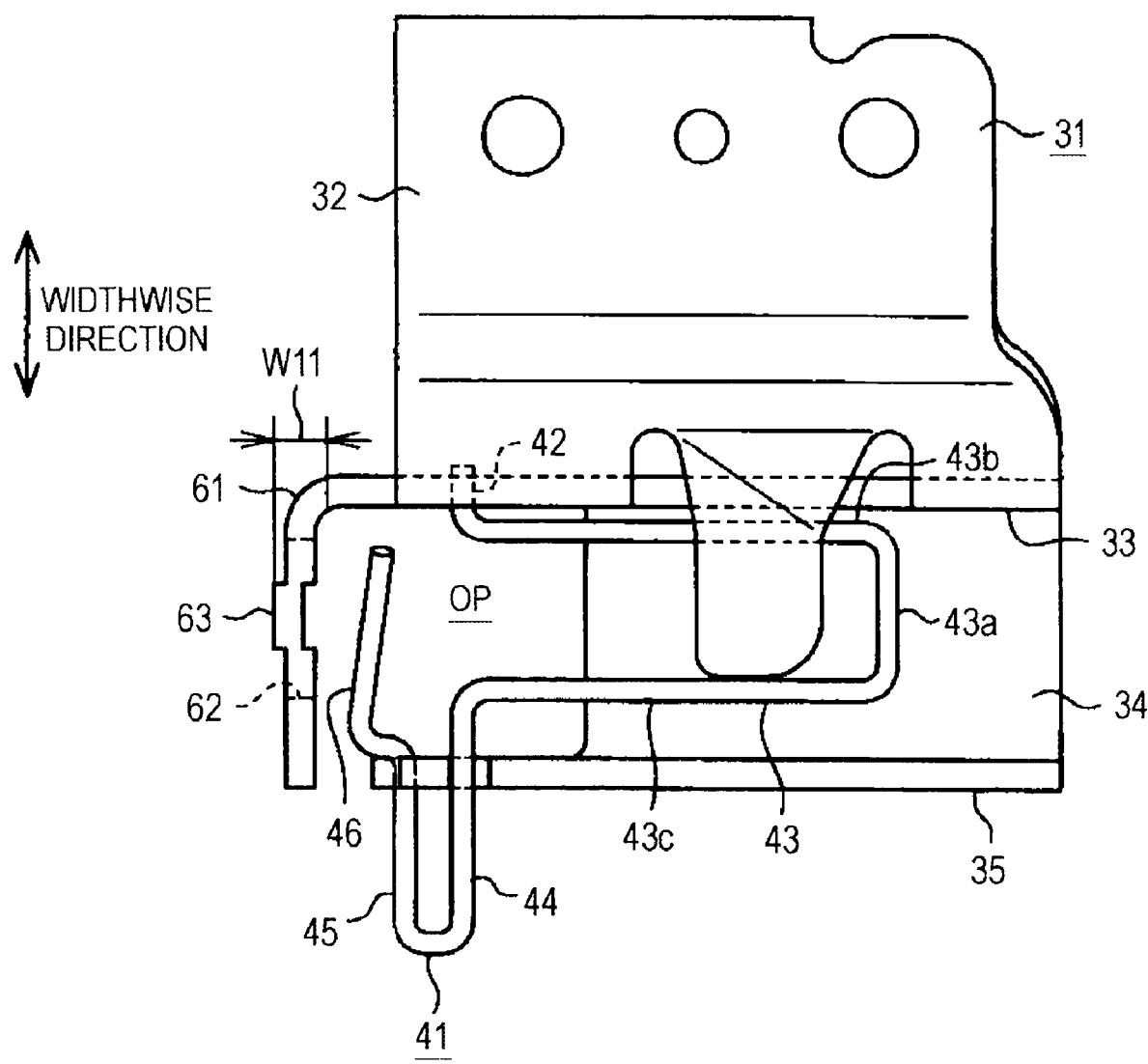
FIG. 6 is a plan view showing a modification of the invention.

As shown in FIG. 6, the supporting bracket 31 may have the flat panel-shaped supporting wall portion 61 being bent from the distal end of the first side wall portion 33 on the opposite side from the lock lever 21 at a substantially right angle and extending toward the second side wall portion 35 in the widthwise direction. The supporting wall portion 61 is also formed with a square insertion hole 62 opening in the longitudinal direction of the upper rail 4. In this case, a half blanking portion 63 as a molded portion projecting in the direction of insertion of the operating lever 51 is formed on the supporting wall portion 61. The half blanking portion 63 is formed over a part of the range of the insertion hole 62.

The supporting wall portion 61 having the half blanking portion 63 has a width W11 which is substantially larger than the width W1 in a range of the holding groove 53 orthogonal to the direction of insertion of the operating lever 51. In other words, the supporting wall portion 61 opposes the upper portion of the operating lever 51 and has the width W11 substantially larger than the width W1. Therefore, when the holding groove 53 passes by the supporting wall portion 61 during the insertion and assembly works of the operating lever 51, the supporting wall portion 61 is not fitted to the holding groove 53 by being blocked by the half blanking portion 63. Such the half blanking portion 63 may be provided by press work (half blankingting) of the supporting wall portion 61, for example.

Figure 8:
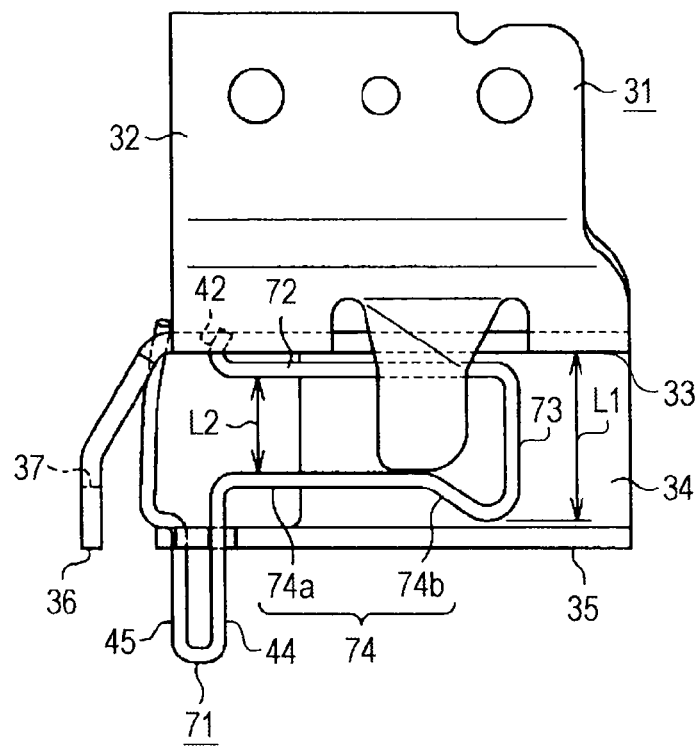
FIG. 8 is a plan view showing the modification of the invention.

As shown in FIG. 8, a torsion spring 71 having a widely formed locked strip portion to be fitted into the holding groove 53 may be employed. In other words, the torsion spring 71 includes a first extending portion 72 being arranged between the first and second side wall portions 33 and 35 above the bottom wall portion 34 and extending from the proximal end of the first terminal portion 42 toward the lock lever 21 in the longitudinal direction of the upper rail 4, a locked strip portion 73 extending linearly toward the second side wall portion 35 in the rail width direction in a state of being bent from a distal end of the first extending portion 72, and a second extending portion 74 extending toward the opposite side of the lock lever 21 in the longitudinal direction of the upper rail 4 in a state of being bent from a distal end of the locked strip portion 73 and continued to the shaft portion 44. Then, the second extending portion 74 includes a proximal end portion 74a extending from the shaft portion 44 in parallel to the first extending portion 72, and a distal end portion 74b continued to the locked strip portion 73 by being displaced gradually from a distal end of the proximal end portion 74a in the widthwise direction of the upper rail 4. Accordingly, in the widthwise direction of the upper rail 4, for example, a length L1 of the locked strip portion 73 is set to be longer than a distance L2 between the first extending portion 72 and the second extending portion 74 of the shaft portion 44 (axis of rotation). Therefore, even though the operating lever 51 is displaced within the range between the first side wall portion 33 and the second side wail portion 35 in the widthwise direction of the upper rail 4, for example, the torsion spring 71 (locked strip portion 73) can be prevented from coming off from the holding groove 53.

The second extending portion 74 is continued to the locked strip portion 73 which is relatively longer in the widthwise direction of the upper rail 4 at the distal end portion 74b thereof. Then, the first extending portion 72 and the second extending portion 74 assume a shape reduced in terms of the widthwise direction of the upper rail 4 at the proximal end portion 74a which extends in parallel to the corresponding first extending portion 72 in comparison with the locked strip portion 73. Therefore, when inserting the operating lever 51 underside the locked strip portion 73 to cause the torsion spring 71 (locked strip portion 73) to be locked in the holding groove 53 arranged on the upper portion of the operating lever 51 during the assembly work of the operating lever 51, the proximal end portion 74a (reduced shape) prevents the operating lever 51 from being erroneously inserted into a frame surrounded by the first extending portion 72, the locked strip portion 73, and the second extending portion 74.

Figure 9:
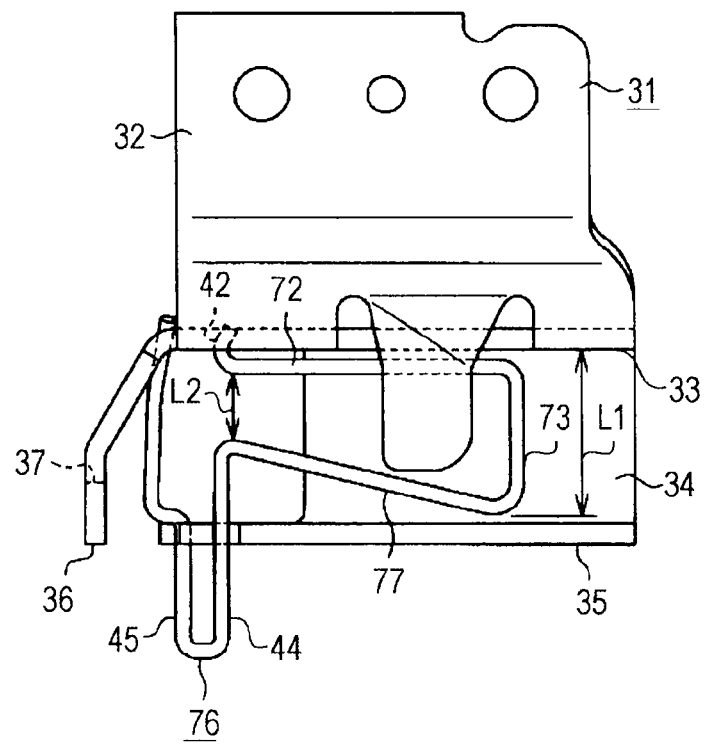
FIG. 9 is a plan view showing the modification of the invention.

Alternatively, as shown in FIG. 9, a torsion spring 76 having a second extending portion 77 which connects the locked strip portion 73 and the shaft portion 44 linearly may also be employed. In this case as well, even though the operating lever 51 is displaced within the range between the first side wall portion 33 and the second side wall portion 35 in the widthwise direction of the upper rail 4 with the mode as described above, the torsion spring 71 (locked strip portion 73) can be prevented from coming off from the holding groove 53. In particular, since the second extending portion 77 extends linearly, the number of steps of bending the same can be reduced.

Figure 10:
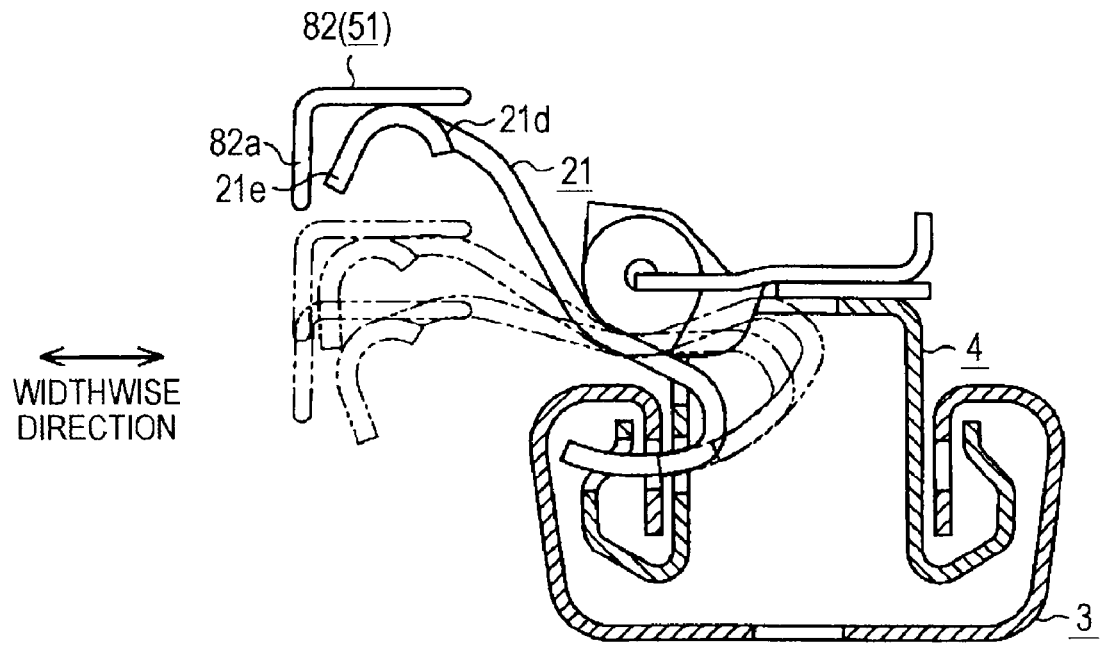
FIG. 10 is a cross-sectional view showing the modification of the invention.

As shown in FIG. 10, a pressing portion 82 as a terminal of the operating lever 51 may be formed by collapsing the each distal end portion 51b into a shape collapsed into a flat panel shape in the vertical direction. In this case, restricting portions 82a are formed on opposing sides of the both pressing portions 82 in terms of the widthwise direction (seat widthwise direction) thereof so as to be inclined substantially downward toward a distal end thereof. The both restricting portions 82a are formed symmetrically in terms of the widthwise direction, and are able to engage bent portions 21e which are inclined from the abutting portions 21d of the lock levers 21 obliquely downward toward distal ends thereof. The both restricting portions 82a are adapted to restrict the displacement of the operating lever 51 in the seat width direction. With such deformation, when the operating lever 51 is about to be displaced in either direction in the seat width direction, the restricting portion 82a of the corresponding distal end portion 51b engages the lock lever 21 (bent portion 21e) to restrict the displacement of the operating lever 51 in the seat width direction. Therefore, further stable release of, the restriction of the movement of the lock lever 21 by the operation of the operating lever 51 is achieved.

In other words, for example, as in the case of the vehicle seat sliding apparatus disclosed in JP-A-2006-298104, for example, if the pressing portion (rear end operating portion) as the terminal of the operating lever has a flat shape only for being placed on the lock lever, since there is no means of restricting the positional displacement of the operating lever in the seat width direction, so that the release of the movement restriction of the lock lever may become unstable depending on the extent of the displacement.

Also, since the pressing portion 82 of the operating lever 51 is provided with the restricting portion 82a, the rigidity can be improved by the increase of the second moment of area.

Figure 11:
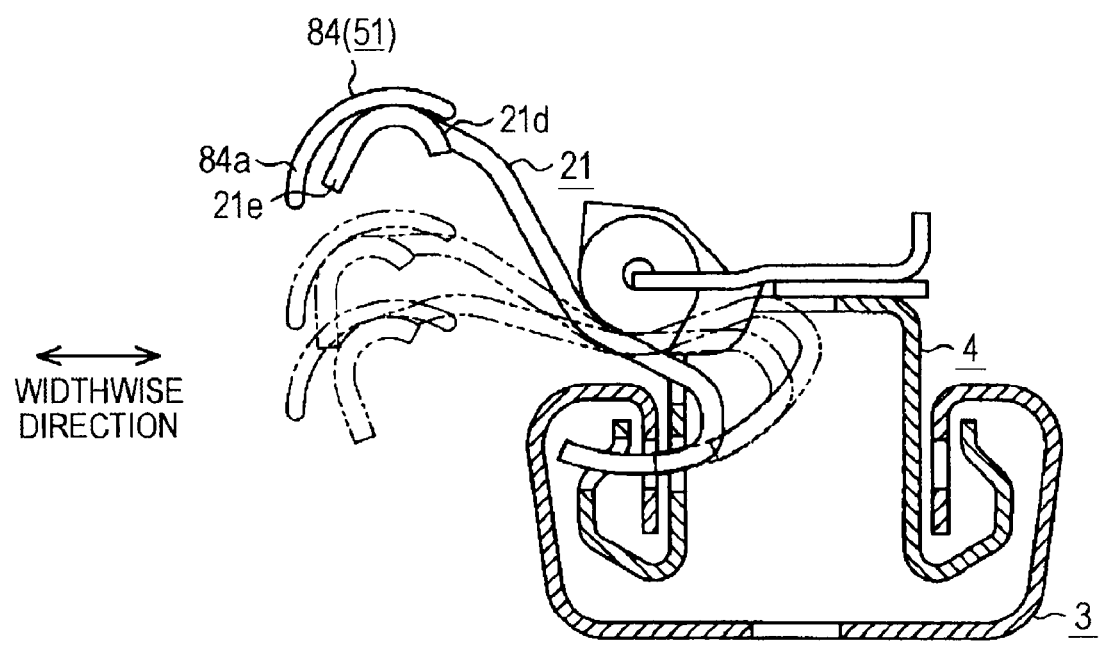
FIG. 11 is a cross-sectional view showing the modification of the invention.

Alternatively, as shown in FIG. 11, a pressing portion 84 as the terminal of the operating lever 51 may be formed by collapsing the each distal end portion 51b into a shape collapsed into an arcuate shape in the vertical direction. In this case, restricting portions 84a are formed on opposing sides of the both pressing portions 82 in terms of the widthwise direction (seat widthwise direction) thereof so as to be extended smoothly substantially downward toward the distal end (lower end) thereof. With such a deformation, the displacement of the operating lever 51 in the seat width direction can be restricted with the mode as described above, and the further stable release of the movement restriction of the lock lever 21 by the operation of the operating lever 51 is achieved.

Although the first side wall portion 33 and the second side wall portion 35 of the supporting bracket 31 are arranged on the side of the upper rail 4 and the opposite side thereof in the rail width direction respectively in the embodiment described above, the positional relation may be vice versa. In this case, the torsion springs 41, 71, and 76 may be assembled basically in the reverse direction so as to match the relation of arrangement of the first and second side wall portions 33 and 35. The supporting wall portion 36 may be continued to the second side wall portion 35.

In the embodiment described above, the urging device to be locked in the holding groove 53 may be, for example, a leaf spring.

In the embodiment described above, the number of locking claws 21c to be provided on the lock lever 21 may be any number as long as there is at least one.

In the embodiment described above, the cross-sectional shape of the lower rail 3 is shown simply as an example. For example, the folded-back wall portions 13 may be protruded outward in terms of the rail widthwise direction.

In the embodiment described above, the cross-sectional shape of the upper rail 4 is shown simply as an example. For example, the folded-back wall portions 16 may be protruded inward in terms of the rail widthwise direction. The cross section of the upper rail 4 is not limited to the U-shape, but may be an inverted T-shape, for example.

The direction of movement of the seat in association with the movement of the upper rail 4 with respect to the lower rail 3 may be, for example, the fore-and-aft direction or the widthwise direction of the vehicle.

According to one embodiment of the invention, the operating lever can be assembled easily to the supporting bracket by inserting the same through the supporting wall portion along the longitudinal direction of the upper rail and causing the urging member to be locked in the holding groove. Accordingly, the axis of rotation of the operating lever can be set separately from the axis of rotation of the lock lever only by inserting the operating lever through the supporting wall portion. In this case, the direction of rotation of the operating lever does not have to match with the direction of rotation of the lock lever. Also the supporting wall portion includes the molded portion having a width wider than the width of the holding groove in terms of the direction of insertion of the operating lever so as to oppose the upper portion of the operating lever within the range of the holding groove in terms of the direction orthogonal to the direction of insertion of the operating lever. Therefore, when the holding groove passes the supporting wall portion during the insertion and assembly works of the operating lever, the molded portion prevents the supporting wall portion (the fulcrum portion of the operating lever) from being fitted into the holding groove. Accordingly, the assembly work of the operating lever can be smoothly performed. Also, since the thickness of the supporting wall portion by itself is not basically constrained by the width of the holding groove, for example, weight increase in association with needless increase in thickness of the supporting wall portion (supporting bracket) or degradation of workability of the supporting bracket can be restrained.

According to one embodiment of the invention, the inclined wall portion as the molded portion can be provided in an extremely simple method by bending the supporting wall portion, for example.

According to one embodiment of the invention, the half blanking portion as the molded portion can be provided by a press work (half blankingting) on the supporting wall portion, for example.

According to one embodiment of the invention, since the length of the locked strip portion is set to be longer than the distance of the axis of rotation between the first extending portion and the second extending portion in the widthwise direction of the upper rail, so that the urging member (locked strip portion) can be prevented from coming off the holding groove even though the operating lever is displaced within the range between the first side wall portion and the second side wall portion in the widthwise direction concerned, for example.

According to one embodiment of the invention, the first extending portion or the second extending portion is continued to the locked strip portion which is relatively longer in the widthwise direction of the upper rail at a distal end portion thereof. In other words, the first extending portion and the second extending portion assume a shape reduced in terms of the widthwise direction of the upper rail at the proximal end portion which extends in parallel to the corresponding first extending portion or the second extending portion in comparison with the locked strip portion. Therefore, when inserting the operating lever underside the locked strip portion to cause the urging member (locked strip portion) to be locked in the holding groove arranged on the upper portion of the operating lever during the assembly work of the operating lever, the proximal end portion (reduced shape) can prevent the operating lever from being erroneously inserted into a frame surrounded by the first extending portion, the locked strip portion, and the second extending portion.

According to one embodiment of the invention, when the operating lever is about to be displaced in either direction in the seat width direction, the restricting portion of the corresponding lever portion engages the lock lever to restrict the displacement of the operating lever in the seat width direction. Therefore, further stable release of the restriction of the movement of the lock lever by the operation of the operating lever is achieved.

According to one embodiment of the invention, a vehicle seat sliding apparatus in which the assembleability of the operating lever can be improved without restrictions in the direction of rotation of the operating lever resiliently held by the urging device is provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus comprising:
a lower rail adapted to be fixed to a vehicle-floor;
an upper rail adapted to be fixed to a seat cushion and connected to the lower rail so as to be movable with respect to the lower rail;
a lock lever rotatably connected to the upper rail and adapted to engage the lower rail to selectively restrict the movement of the upper rail with respect to the lower rail;
a supporting bracket fixed to the upper rail;
an operating lever rotatably connected to the supporting bracket and being capable of transmitting an operating force to the lock lever to release the restriction of movement by being linked with the lock lever; and
an urging member adapted to resiliently hold the operating lever, wherein
the supporting bracket includes a plate-shaped supporting wall portion which is adapted to serve as a fulcrum of rotation of the operating lever at an abutting portion with respect to an upper portion of the operating lever when the operating lever is inserted therein along the longitudinal direction of the upper rail,
the operating lever is formed with a slit-like holding groove adapted to lock the urging member therein on the upper portion thereof on the side of the lock lever with respect to the supporting wall portion in terms of the longitudinal direction of the upper rail so as to extend in the direction orthogonal to the direction of insertion of the operating lever, and
the supporting wall portion has a molded portion opposing an upper portion of the operating lever within the range of the holding groove in the direction orthogonal to the direction of insertion of the operating lever and having a width wider than the width of the holding groove in terms of the direction of insertion of the operating lever.

2. The vehicle seat sliding apparatus according to claim 1, wherein the molded portion is an inclined wall portion inclining with respect to the direction orthogonal to the direction of insertion of the operating lever.

3. The vehicle seat sliding apparatus according to claim 1, wherein the molded portion is a half blanking portion projecting in the direction of insertion of the operating lever.

4. The vehicle seat sliding apparatus according to claim 1, wherein the supporting bracket includes:

a first side wall portion and a second side wall portion disposed on both sides of the operating lever in terms of the widthwise direction on the side of the lock lever with respect to the supporting wall portion in terms of the longitudinal direction of the upper rail, the urging member is a torsion spring formed of a single wire member including:

a first terminal portion adapted to be inserted into the first side wall portion, a first extending portion arranged between the first and second side wall portions and extending from a proximal end of the first terminal portion toward the lock lever in terms of the longitudinal direction of the upper rail, a locked strip portion extending from a distal end of the first extending portion toward the second side wall portion in terms of the widthwise direction of the upper rail to be locked in the holding groove, a second extending portion extending from a distal end of the locked strip portion toward the opposite side of the lock lever in terms of the longitudinal direction of the upper rail, a shaft portion bent from a distal end of the second extending portion and adapted to be inserted into the second side wall portion so as to serve as an axis of rotation of the first extending portion, the locked strip portion, and the second extending portion in cooperation with the first terminal portion, a locked portion folded back from a distal end of the shaft portion, inserted into the second side wall portion at a position different from the shaft portion, and adapted to cause the locked strip portion to generate an urging force to urge the upper portion of the operating lever downward, and a second terminal portion extending from a distal end of the locked portion and adapted to urge a lower portion of the operating lever upward on the side of the lock lever with respect to the supporting wall portion in terms of the longitudinal direction of the upper rail, and the length of the locked strip portion is set to be longer than the distance of the axis of rotation between the first extending portion and the second extending portion.

5. The vehicle seat sliding apparatus according to claim 4, wherein at least one of the first extending portion and the second extending portion includes a proximal end portion extending in parallel to the corresponding first extending portion or the second extending portion and a distal end portion displaced gradually in the widthwise direction of the upper rail from a distal end of the proximal end portion and connected to the locked strip portion.

6. A vehicle seat sliding apparatus comprising:

a pair of lower rails adapted to be fixed to a vehicle-floor;

a pair of upper rails adapted to be fixed to a seat cushion and connected to the lower rails so as to be movable with respect to the lower rails;

a pair of lock levers adapted to be rotatably connected to the upper rails on the sides of the both upper rails opposing to each other in terms of the seat width direction to selectively restrict the movement of the upper rails with respect to the lower rails by engaging the lower rails;

a pair of supporting brackets fixed to the upper rails on the sides of the both upper rails opposing to each other in terms of the seat width direction; and an operating lever integrally including an operating portion extending in the seat width direction and a pair of lever portions bent from both ends of the operating portion in the fore-and-aft direction of the seat and rotatably connected to the supporting brackets, and being capable of transmitting an operating force to the lock levers to release the restricted state of movement by being linked with the lock levers at terminal ends thereof, wherein a pair of restricting portions formed on the sides of the both lever portions at the terminal ends opposing to each other in terms of the seat width direction and engage the lock levers to restrict the operating lever from being displaced in the seat width direction.

\* \* \* \* \*